US011507956B2

(12) United States Patent
Edwards et al.

(10) Patent No.: US 11,507,956 B2
(45) Date of Patent: Nov. 22, 2022

(54) SYSTEMS FOR ALERTING USER TO UNDESIRED COMPONENTS IN PURCHASE ITEMS

(71) Applicant: Capital One Services, LLC, McLean, VA (US)

(72) Inventors: Joshua Edwards, Phildelphia, PA (US); Latika Gulati, Vienna, VA (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/872,018

(22) Filed: May 11, 2020

(65) Prior Publication Data

US 2021/0350377 A1 Nov. 11, 2021

(51) Int. Cl.
*G06Q 20/20* (2012.01)
*G06Q 20/40* (2012.01)
*G06Q 20/38* (2012.01)

(52) U.S. Cl.
CPC ....... *G06Q 20/4016* (2013.01); *G06Q 20/386* (2020.05); *G06Q 20/4014* (2013.01)

(58) Field of Classification Search
None
See application file for complete search history.

(56) References Cited

U.S. PATENT DOCUMENTS

| 8,295,863 | B1 * | 10/2012 | Gupta | G06Q 30/00 455/466 |
| 11,094,124 | B1 * | 8/2021 | Schweinfurth | G06F 9/451 |
| 2007/0143256 | A1 * | 6/2007 | Starr | G06Q 30/02 |
| 2013/0305335 | A1 * | 11/2013 | Syed | G06Q 20/4016 726/7 |

* cited by examiner

*Primary Examiner* — Joseph W. King
(74) *Attorney, Agent, or Firm* — Perkins Coie LLP

(57) ABSTRACT

A system for alerting a user of undesired components in purchase items is provided. The system comprises receiving a list of undesired components of purchased items, and defining an alert to a user of an undesired component in a purchased item, the alert comprising an alert timing configuration and an undesired component identification. The system further comprises receiving a notice that the user purchased an item, determining whether a listing of the purchased item has been automatically collected, and generating a list of components of the purchased item when the purchased item listing has been automatically collected, and obtaining from the user the list of components of the purchased item when the purchased item listing has not been automatically collected. The system further determines whether the purchased item contains an undesired component, and upon determining that the purchased item contains art undesired component, sends the alert to the user.

20 Claims, 10 Drawing Sheets

SYSTEMS FOR ALERTING USER TO UNDESIRED COMPONENTS IN PURCHASE ITEMS

TECHNICAL FIELD

The present disclosure generally relates to a system for alerting a user to undesired components in purchase items.

BACKGROUND

Reliably and seamlessly checking ingredients in groceries is burdensome and often entails checking confusing labels. Worse, in some scenarios, the grocery label may be a language unknown to the customer. Nevertheless, despite these concerns, customers wish to avoid certain ingredients for health concerns, or certain items for social, economic, or environmental reasons. In some situations, the customer may wish to be alerted to potential undesired components prior to purchase, and certainly after purchase.

As one example, a customer may wish to avoid peanuts due to a peanut allergy. The customer may be familiar with certain products that contain peanuts, and know to stay away from those products, however, the customer may unknowingly purchase and consume other products containing undesired amounts of peanut ingredients. This custom benefit from a system that automatically scans their purchases for harmful ingredients and further provides the customer with alerts after detecting harmful purchases.

As another example, a customer may be traveling in a foreign country with specific diet intolerance (i.e. gluten intolerance), however the grocery items contain labels in a foreign language. This customer may seek a system, or applet, enabling them to an item and determine itemized ingredients in a familiar language.

As another example, a customer may believe they are purchasing kosher appropriate pork substitute groceries, when in fact, the label is deceiving or fails to satisfy the customer's needs. This customer may seek a system that provides real time information about purchase items and itemized components for those items.

Moreover, while some solutions exist for monitoring customer purchases and groceries, such solutions typically stop there. These prior solutions fail to collect the necessary data, analyze the purchase data, and provide the user with real time alerts for flagged itemized components, such as targeted ingredients.

The present disclosure provides systems and devices to solve these and other problems.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a processor, it is to be understood that the disclosed embodiments are not limited to any particular industry.

Disclosed embodiments include a system for alerting a user of undesired components in purchased items including one or more memory devices storing instructions and one or me e processors configured to execute the instructions. The system further comprises receiving a list of undesired components of purchased items, and defining an alert to a user of an undesired component in a purchased item, the alert comprising an alert timing configuration and an undesired component identification. The system further comprises receiving a notice that the user purchased an item, determine whether a listing of the purchased item has been automatically collected, and generating a list of components of the purchased item when the purchased item listing has been automatically collected, and obtaining from the user the list of components of the purchased item when the purchased item listing has not been automatically collected. The system further determines whether the purchased item contains an undesired component, and upon determining that the purchased item contains an undesired component, sending the alert to the user.

It is to be understood that both the foregoing general description and the following detailed description are exemplary and explanatory only, and are not restrictive of the disclosed embodiments, as claimed.

BRIEF DESCRIPTION OF DRAWINGS

The accompanying drawings, which are incorporated in and constitute a part of the specification, illustrate several embodiments and, together with the description, serve to explain the disclosed principles. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Wherever convenient, the same reference numbers will be used throughout the drawings to refer to the same or like parts. Unless explicitly stated, sending and receiving as used herein are understood to have broad meanings, including sending or receiving in response to a specific request or without such a specific request. These terms thus cover both active forms, and passive forms, of sending and receiving.

The disclosed embodiments are directed to systems and methods for alerting a user of undesired components in purchase items. As used herein, "purchase item" refers to items considered for purchase and purchased items. While some solutions exist for users to monitor undesired purchases, such solutions typically stop there. Those solutions fail to utilize component level data across several purchased items, and fail to provide real-time alerts for the user. Furthermore, none of the other solutions utilize automatic data gathering tools or purchased item data to offer robust information and alerts for the users, such as foreign language translation. There is no system for alerting a user of undesired components in purchased items comprising generating lists of components of purchased items and analyzing the list of components, or even sub-components.

The following description provides examples of systems and methods for alerting a user of undesired components in purchased items. The arrangement of components shown in the figures is not intended to limit the disclosed embodiments, as the components used in the disclosed systems may vary.

Figure 1A:
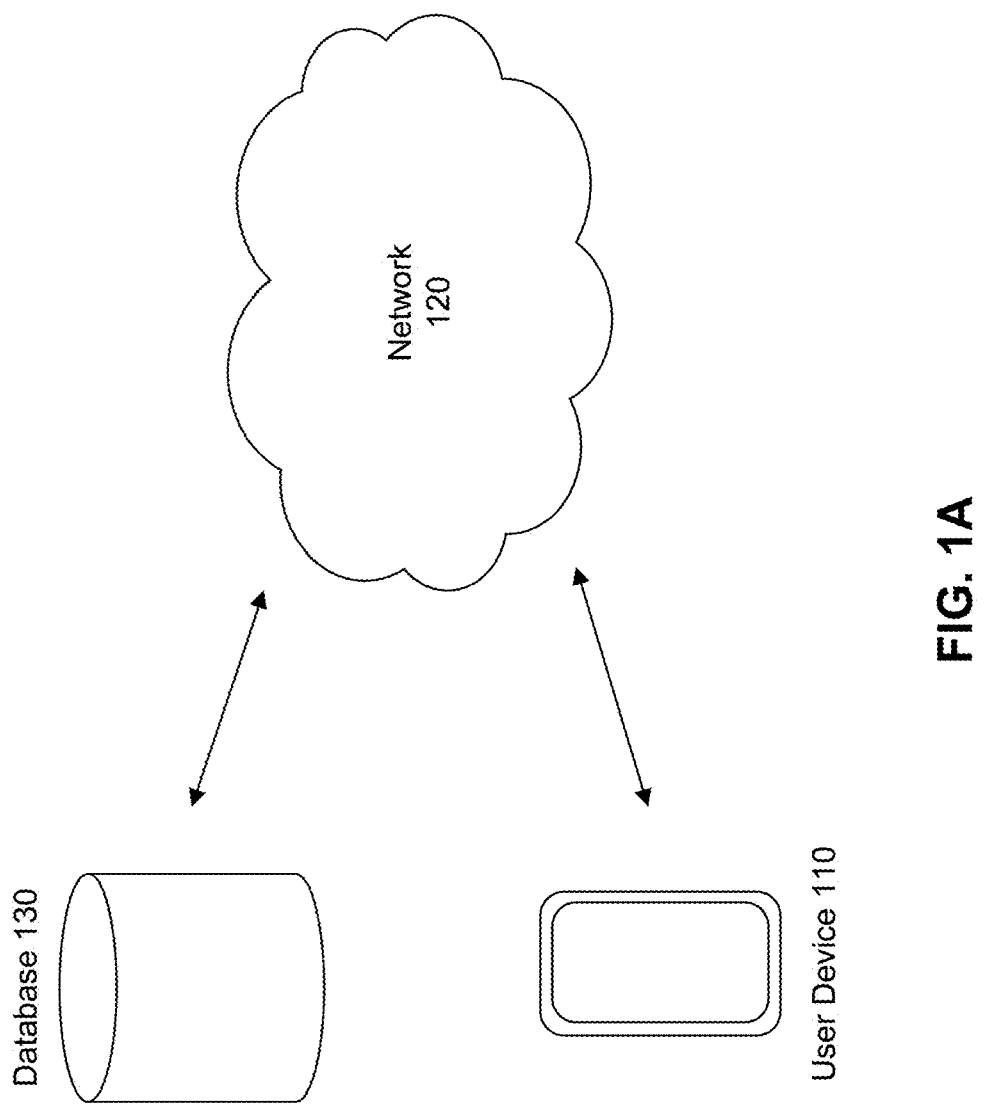
FIG. 1A is a block diagram of an exemplary system, consistent with disclosed embodiments.

FIG. 1A is a block diagram illustrating an exemplary system 100 for alerting a user f undesired components in purchased items. System 100 may be used to set up an alert for a use based on undesired ingredients in purchased groceries such as ingredients pertinent to an allergy or a particular diet. Alternatively, in some embodiments, system 100 may be used to set up an alert for a user based on undesired chemicals in purchased household cleaning products. In some embodiments, system 100 may be used to set up an alert for a user based on undesired components for functioning vehicles such as improper purchased gasoline or motor oil. Alternatively, its some embodiments, system 100 may be used to set up an alert based on undesired implications for social or environmental causes such as purchased shoes containing components from known companies utilizing child labor, or containing components from known companies with high carbon emissions. System. 100 may include a user device 110, a network 120, and a database 130. In some embodiments, as shown in FIG. 1A, each component of system 100 may be connected to network 120. However, in other embodiments, components of system 100 may be connected directly with each other without network 120.

User device 110 may include one or more computing devices configured to perform operations consistent with disclosed embodiments. For example, user device 110 may include at least, one of a desktop computer, a laptop, a server, a mobile device (e.g., tablet, smart phone, etc.), a gaming device, a wearable computing device, or other type of computing device. User device 110 may include one or more processors configured to execute software stored as instructions in memory. User device 110 may implement software to perform Internet-related communication and content display processes. For instance, user device 110 may execute browser software that generates and displays interfaces, including content, on a display device included in, or connected to, user device 110. User device 110 may execute applications that allow user device 110 to communicate with components over network 120, and generate and display content in interfaces via a display device included in user device 110. The disclosed embodiments are not limited to any particular configuration of user device 110. For instance, user device 110 can be a mobile device that stores and executes mobile applications that interact with network 120 and database 130 to perform aspects of the disclosed embodiments, such as alerting users. In certain embodiments, user device 110 may be configured to execute software instructions relating to location services, such as GPS locations. For example, user device 110 may be configured to determine a geographic location and provide location data and time stamp data corresponding to the location data. In yet other embodiments, user device 110 may capture video and/or images, or alternatively, user device 110 may play video and/or audio as well as display images.

Network 120 may be any type of network configured to provide communications between components of system 100. For example, network 120 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 120. In various embodiments, one or more components of system 100 may communicate directly through one or more dedicated communication links.

Database 130 may include one or more computing devices configured to provide data to one or more of user device 110 or network 120. In some aspects, such data may include user account data such as username, email, password, or other such registration information. Alternatively, in alternative embodiments, such data may include information for the alert such as the type of alert category, the user preferences, the severity, the alert timing and frequency, or additional notes. Such data may include captured data such as images or videos of products and/or item SKU codes, or alternatively, in some embodiments such data may include uploaded information from the user or a third-party source. Such data may also include user notes on particular items. Database 130 may include, for example, one or more Oracle™ databases, Sybase™ databases, or other relational databases or non-relational databases, such as Hadoop™ sequence files, HBase™, or Cassandra™. Database(s) 130 may include computing components (e.g., database management system, database server, etc.) configured to receive and process requests for data stored in memory devices of the database(s) and to provide data from the database(s). While database 130 is shown separately, in some embodiments database 130 may be included in or otherwise related to one or more of user device 110 and/or network 120.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 1B:
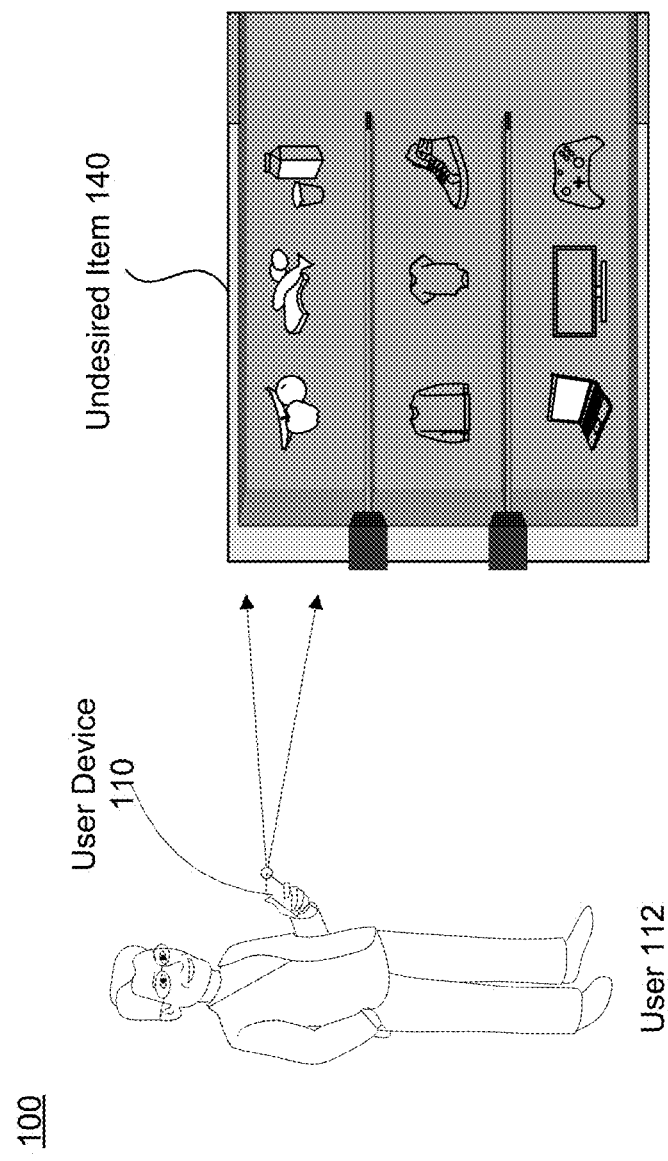
FIG. 1B is a diagram of an exemplary retail venue consistent with disclosed embodiments.

FIG. 1B shows an exemplary environment illustrating use of system 100 consistent with the disclosed embodiments. User device 110 is consistent with the functions and properties described throughout FIG. 1A. A user 112 is an individual, or group of individuals, who utilizes user device 110 embedded with an alert application(s) configured to perform the functions of system 100 and described herein for alerting the user of an undesired components in purchased items. The user 112 may be a customer of a third-party venue attempting to purchase goods, including undesired item 140. And user 112 may be simultaneously using the alert application consistent with the methods described herein, and in particular FIGS. 4-5.

In some embodiments, user 112 may utilize user device 110, installed with the alert application, to identify purchasable goods, including undesired item 140. In some embodiments, user 112 may have a version of an alert application, such that the alert application automatically identifies purchased items based on third-party data, electronic receipts, or email notifications. Alternatively, in other embodiments, user 112 may have a version of an alert application, such that the alert application does not automatically identify purchased items consistent with the methods described herein, and in particular FIG. 1C.

Undesired item 140 is a good that user 112 may purchase and that may further contain undesired components. User 112 may utilize user device 110 to capture images of undesired item 140 to the alert application through the means described herein. In some embodiments, undesired item 140 may be a food consumable such as fruits, vegetables, meats, dairies, or grains and mixed and prepared consumables such as prepared meals, snack bars, canned beverages, etc.. Alternatively, in some embodiments, undesired item 140 may be a household consumable good such as cleaning products, toiletries, or personal hygiene products. In some embodiments, undesired item 140 may be clothing such as shirts, pants, or footwear ranging from infant to adult sizes. In some embodiments, undesired item 140 may be household appliances such as microwaves, refrigerators, washers, dryers, dishwashers, etc., or alternatively, electronics such as computers, televisions, gaming devices, etc. In some embodiments, undesired item 140 may be components for automobile servicing such as motor oil, gasoline, spare parts, etc. One skilled in the art would understand that the undesired item 140 is not limited by the categories of products listed herein. And the undesired components may be ingredients or sub-components of the undesired item 140 such as allergens like peanuts or other such ingredients detrimental to the user's diet, or alternatively, the undesired components may be components that the user is sensitive to (i.e. causes itchy skin or rash outbreaks), components that the user knows may be damaging (i.e. strong bleach cleaning products), or components that are health concern is (i.e. products not deemed safe for infants), etc. In some embodiments, the undesired components may be undesired due to their environmental impact (i.e. the component has a high carbon footprint to manufacture), or alternatively, due to their social ramifications (i.e. the component is manufactured by child labor), etc. One skilled in the art would understand that the undesired components are not limited by the sub-categories of components listed herein.

Figure 1C:
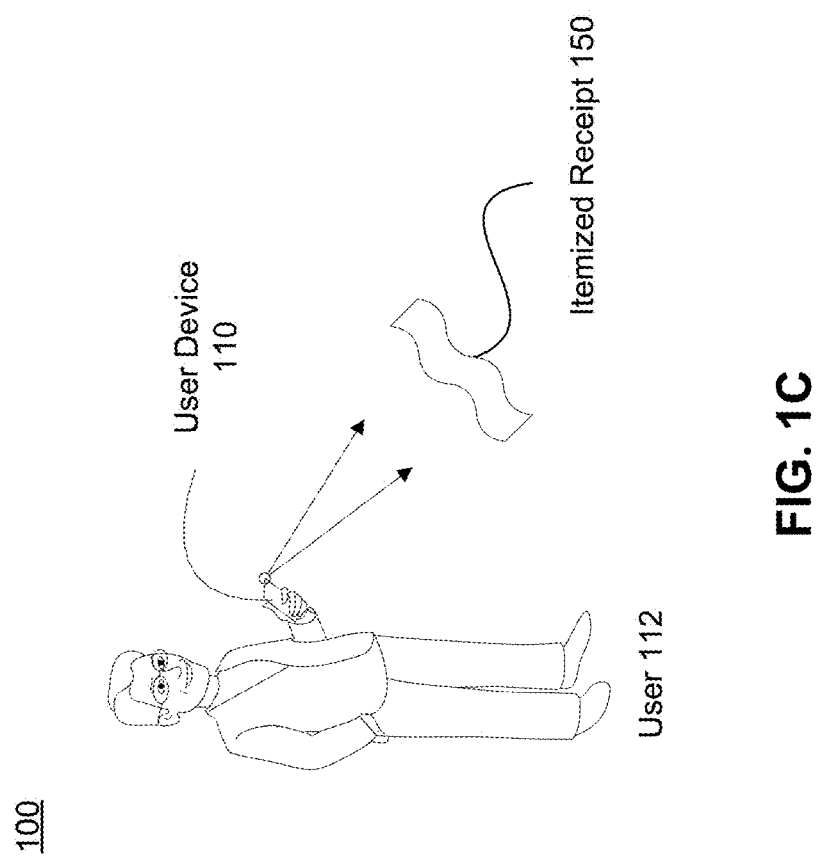
FIG. 1C is a diagram of an exemplary purchased item list collection consistent with disclosed embodiments.

FIG. 1C shows an exemplary environment illustrating use of system 100 consistent with the disclosed embodiments. Like FIG. 1B, user device 110 and user 112 are consistent with the functions and properties described throughout. The user 112 may be a customer of a third-party venue attempting to purchase goods, including u desired item 140 from FIG. 1B And user 112 may be simultaneously using the alert application consistent with the methods described herein, and in particular FIGS. 4-5.

In some embodiments, user 112 may utilize user device 110, installed with an alert application configured to perform the operations and methods consistent with those described herein, to identify purchased goods, including undesired item 140. In some embodiments, user 112 may have a version of an alert application, such that the alert application automatically identifies purchased items based on third-party data such as itemized electronic receipts from merchants and vendors. Alternatively, in some embodiments, the alert application may automatically scan user emails for itemized receipt data from third-party vendors. In some embodiments, the alert application may be further associated with a web browser n monitoring applet that scans for itemized receipt data from online purchases. In some embodiments, the alert application may also receive data from augmented reality applications and devices that monitor the user's purchasing behavior. Alternatively, in other embodiments, user 112 may have a version of the alert application, such that the alert application does not automatically identify purchased items and the alert application may prompt the user to upload images of the printed itemized receipt 150 from the merchant or vendor. The alert application may analyze the uploaded images of the printed itemized receipt 150 with Optical Character Recognition (OCR) software to identify purchased items.

Figure 2:
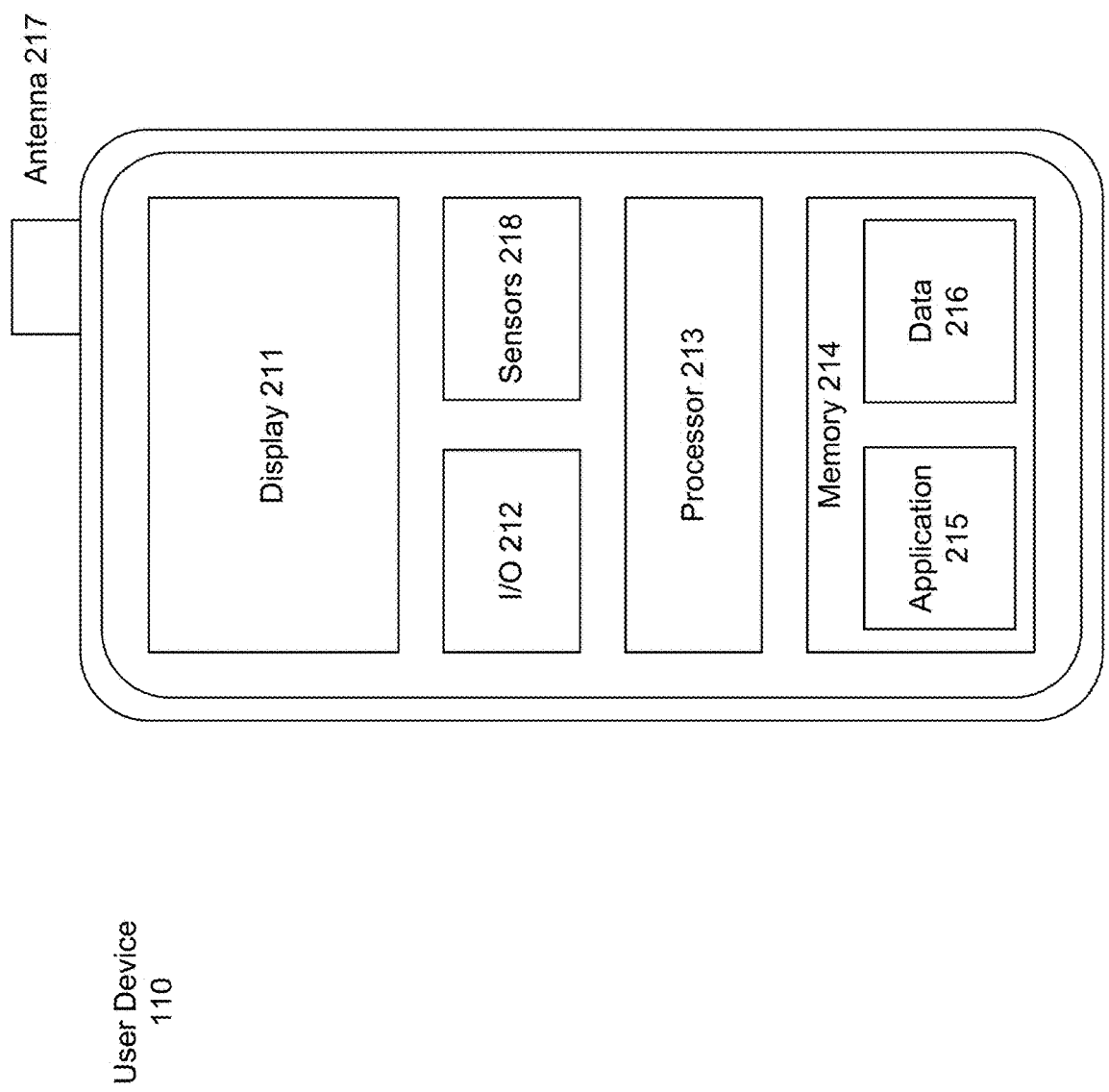
FIG. 2 is a diagram of an exemplary electronic system, consistent with disclosed embodiments.

FIG. 2 illustrates an exemplary configuration of user device 110, consistent with disclosed embodiments. Variations of user device 110 may be used to implement portions or all of each of the devices of system 100. Likewise, even though FIG. 2 depicts user device 110, it is understood that devices associated with network 120 and database 130 may implement portions illustrated by exemplary user device 110. As shown, user device 110 may include a display 211, an input/output ("I/O") device 212, one or more processors 213, and a memory 214 having stored therein one or more program applications 215, and data 216. User device 110 also may include an antenna 217 and one or more sensors 218. One or more of display 211, 110 devices 212, processor(s) 213, memory 214, antenna 217, or sensor(s) 218 may be connected to one or more of the other devices depicted in FIG. 2. Such connections may be accomplished using a bus or other interconnecting device(s).

I/O devices 212 may include one or more devices enabling user device 110 to receive input from a user, such as user 112, and provide feedback to the user. I/O devices 212 may include, for example, one or more buttons, switches, speakers, microphones, or touchscreen panels. Additionally, I/O devices 212 may include in some embodiments augmented reality sensors and/or augmented reality eyewear. In some embodiments, I/O devices 212 may be manipulated by user 112 to input information into user device 110.

Processor 213 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 213 may constitute a single core or multiple core processors that executes parallel processes simultaneously. For example, processor 213 may be a single core processor configured with virtual processing technologies. In certain embodiments, processor 213 may use logical processors to simultaneously execute and control multiple processes. Processor 213 may implement virtual machine technologies, or other known technologies to provide the ability to execute, control, run, manipulate, store, etc., multiple software processes, applications, programs, etc. In another embodiment, processor 213 may include a multiple-core processor arrangement (e.g., dual, quad core, etc.) configured to provide parallel processing functionalities to allow user device 110 to execute multiple processes simultaneously. One of ordinary skill in the art would understand that other types of processor arrangements could be implemented that provide for the capabilities disclosed herein.

Memory 214 may be a volatile or non-volatile, magnetic, semiconductor, tape, optical, removable, non-removable, or other type of storage device or tangible (i.e., non-transitory) computer-readable medium that stores one r yore program applications 215, and data 216. Program applications 215 may include, fore alert application configured to perform the operations and methods consistent with those described herein, and in particular FIGS. 3A-3D.

Program applications 215 may also include operating systems (not shown) that perform known operating system functions when executed by one or more processors. By way of example, the operating systems may include Microsoft Windows™, Unix™, Linux™, Apple™, or Android™ operating systems, Personal Digital Assistant (PDA) type operating systems, such as Microsoft CE™, or other types of operating systems. Accordingly, disclosed embodiments may operate and function with computer systems running any type of operating system. User device 110 may also include communication software that, when executed by processor 213, provides communications with network 120, such as Web browser software, tablet, or smart handheld device networking software, etc. User device 110 may be a device that executes mobile applications for performing operations consistent with disclosed embodiments, such as tablet, mobile device, or smart wearable device.

Data 216 may include, for example, customer personal information, account information, and display settings and preferences. In some embodiments, account information may include items such as, for example, an alphanumeric account number, account label, account issuer identification, an ID number, and any other necessary information associated with a user and/or an account associated with a user, depending on the needs of the user, entities associated with network 120, and/or entities associated with system 100.

User device 110 may also store data 216 in memory 214 relevant to the examples described herein for system 100. One such example is the storage of user device 110 location proximity to purchased goods data such as undesired component 140 data or itemized receipt 150 data, obtained from sensors 218. Data 216 may contain any data discussed above relating to the undesired item 140, and/or sub-category undesired components. For example, in some embodiments, data 216 may contain data relating to undesired item 140 such as a peanut allergy, the amount of peanuts considered harmful, and the appropriate remedies if the user consumes the specified harmful amounts. Alternatively, data 216 may contain user 112 data such identification data, account data, and log-in information, etc., and in particular data described for FIGS. 3A-3D. In some embodiments, data 216 may contain information from third-party sources, for instance, the venue or merchant may provide system 100 with information for purchased items based on. SKU codes or identified pictures of the item or itemized receipt 150.

Antenna 217 may include one or mote devices capable of communicating wirelessly. As per the discussion above, one such example is an antenna wirelessly communicating with network 120 via cellular data or Wi-Fi. Antenna 217 may further communicate with database 130 through any wired and wireless means.

Sensors 218 may include one or more devices capable of sensing the environment around user device 110 and/or movement of user device 110. In some embodiments, sensors 218 may include, for example, an accelerometer, a shock sensor, a gyroscope, a position sensor, a microphone, an ambient light sensor, a temperature sensor, and/or a conductivity sensor. In addition, sensors 218 away include devices for detecting location, such as, a Global Positioning System (GPS), a radio frequency triangulation system based on cellular or other such wireless communication and/or other means for Determining user device 110 location.

In certain embodiments, user device 110 may include a power supply, such as a battery (not shown), configured to, provide electrical power to user device 110.

FIGS. 3A-3D illustrate interfaces of an exemplary alert application 300. In some embodiments, alert application 300 may include the user 112 interactive application 215 stored on user device 110, or alternatively, in other embodiments, alert application 300 may be stored in database 130. Application 300 nay be an application interface applet for a web browser. Application 300 may comprise of sub-menus such as account 310, setup 320, scan 330, and alert 340 described in FIGS. 3A-3D.

Figure 3A:
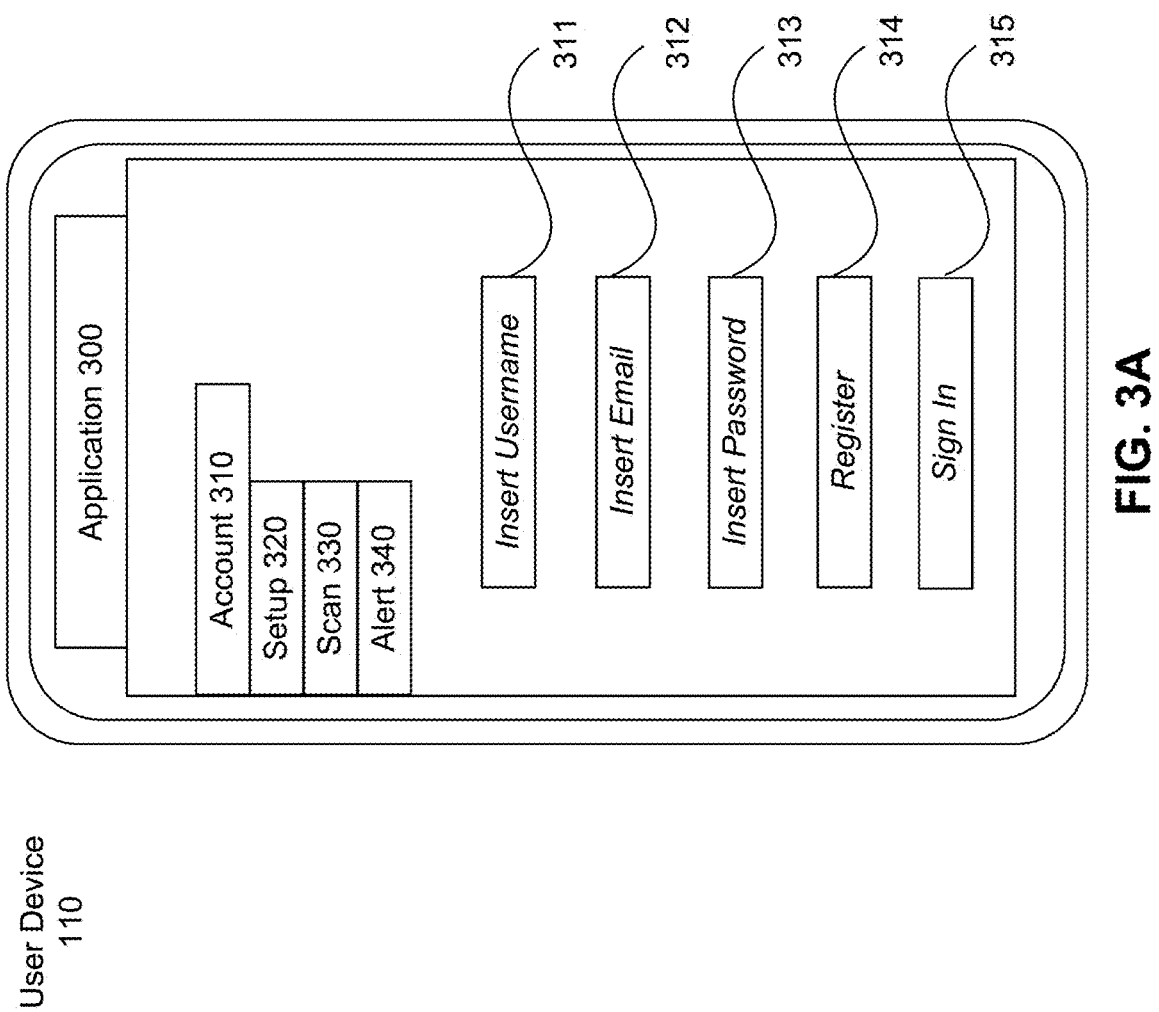
FIG. 3A is a diagram of an exemplary alert system consistent with disclosed embodiments.

FIG. 3A illustrates an interface of an exemplary alert application 300 and sub-menu account 310. Alert application 300 may collect and register account information for user 112, in account 310 sub-menu, such as the user's account name, user's account email, user's account password, and other such registration information. Alert application 300 may prompt user 112 to create a username with an interactive button such as insert username 311. Similarly, alert application 300 may prompt user 112 to provide contact information (i.e. email address, phone number) with an interactive button such as insert email 312. In some embodiments, alert application 300 may prompt user 112 to create a password associated with the account acid username with an interactive button such as insert password 313. Alert application 300 may validate user 112 information during the registration process by requesting user 112 confirm information such as the requested email or the requested password, and alert application 300 may prompt further registration validations or confirmations with an interactive button or field such as register 314. After registration, each of the interactive buttons, 311-314, may be used for user 112 to sign into the account with interactive button sign in 315.

Figure 3B:
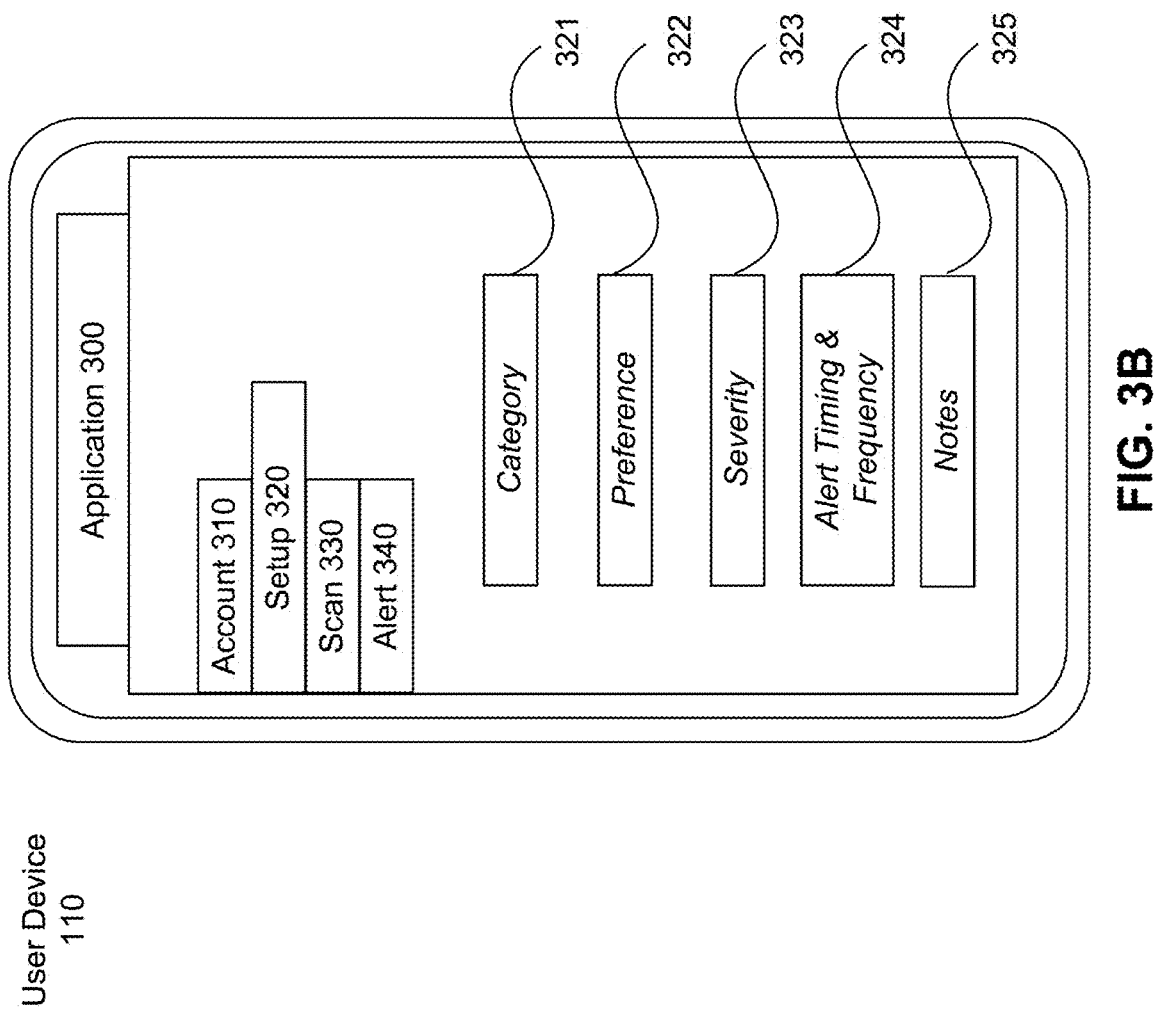
FIG. 3B is a diagram of an exemplary alert system consistent with disclosed embodiments.

FIG. 3B illustrates an interface of an exemplary alert application 300 and sub-menu setup 320. User 112 may use setup 320 to create and manage their alerts for undesired item purchases. For instance, user 112 may create a specific alert by providing system 100 with information pertaining to the interested alert through the setup 320 fields such as category 321, preference 322, severity 323, alert timing & frequency 324, and notes 325. As described herein, system 100 provides an alert for various categories of purchasable goods that the user may wish to be informed about. Category 321 may include an interactive field wherein user 112 selects from several pre-existing categories such as dietary, pharmaceutical, cleaning supplies, household goods, apparel, small home electronics, large home electronics, automotive supplies, home tools, outdoor tools, etc., as well as, social and environmental categories. Alternatively, in some embodiments, category 321 may include an interactive field wherein user 112 may create their own category. It will be understood from one skilled in the art that user 112 may create several alerts, either for multiple different categories (i.e. an alert for a dietary component and an alert for a cleaning product), and the same category (i.e. a dietary alert for peanuts and a dietary alert for seafood).

For each respective created alert, user 112 may provide system 100 with preferences in the field preference 322. Preference 322 may include an interactive field wherein user 112 selects from several pre-existing known preferences such as no allergens entirely. Alternatively, in some embodiments, preference 322 may include an interactive field wherein user 112 provides input completing the preference such as "limit sugar amount to x" where x is a certain mass value, percentage of recommended daily diet, etc., or in some embodiments, user 112 may specify a preference to lag when a purchased item contains any amount of undesired component.

User 112 may provide system 100 with information pertaining to the respective alert severity. Severity 323 may include an interactive field wherein user 112 selects from several pre-existing known degrees of severity indicating the exemplary peanut allergy alert is a "4" on a scale of 0 to 10 wherein 10 is deathly serious. Alternatively, in some embodiments, severity 323 may include an interactive field wherein user 112 creates their own severity flag or scale.

In some embodiments, user 112 may provide system 100 with information pertaining to the respective alert timing and frequency. Alert timing & frequency 324 may include an interactive field wherein user 112 selects from several pre-existing timing and frequency options. For instance, for alert timing, user 112 may require the alert immediately, or in some embodiments, user 112 may wish the alert arrives after a specific amount of time. For frequency, user 112 may wish the alerts arrive the same time daily, weekly, or monthly, or alternatively, for higher severe alerts, user 112 may wish the alert repeats itself at set or increasing/decreasing time intervals. In some embodiments, user 112 may set a condition for activating the alert such as during time periods or religious or dietary fasting periods (i.e. an alert temporarily activated prior to a religious fasting holiday). In some embodiments, user 112 may set a condition for deactivating the alert such as the conclusion of fasting periods or expiration of the alert severity. It will be understood by one skilled in the art that these embodiments are not limited to the examples provided in 321-324, and that various combinations of categories 321, preferences 322, severities 323, alert timing & frequencies 324 exist.

User 112 may also provide system 100 with specific notes for each alert with field notes 325. The information in notes 325 may be relevant for any of the fields 321-324, or alternatively, in some embodiments, the information in notes 325 may be a reminder for user 112.

It will be further understood, while the above embodiments discuss setting alerts for purchased items, that in some embodiments the alerts may be setup for unpurchased goods. For instance, in some embodiments, the user may set up alerts for goods they may purchase. As described below for FIGS. 3C-3D, system 100 may have access to data from a web browser and/or applet, and system 100 may receive information pertaining to goods in the user's virtual shopping basket prior to purchase. Alternatively, system 100 may receive information manually or automatically, from goods in the merchant venue prior to purchase as well. User 112 may also setup alerts for these unpurchased goods as well.

Figure 3C:
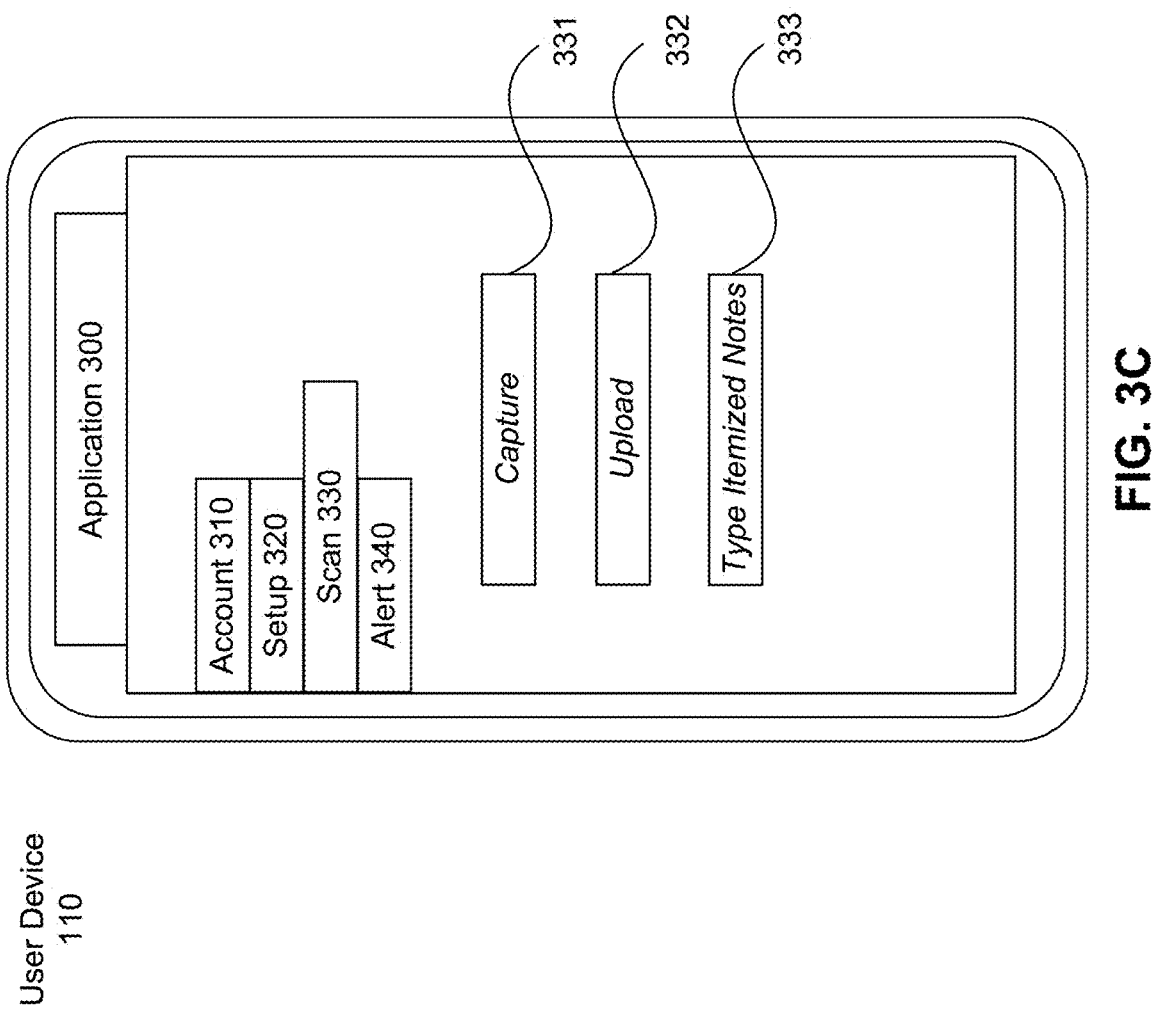
FIG. 3C is a diagram of an exemplary alert system consistent with disclosed embodiments.

FIG. 3C illustrates an interface of an exemplary alert application 300 and sub-menu scan 330. User 112 may use scan 330 to manually or automatically collect itemized purchased item data. And through the scan 330 fields capture 331, upload 332, and itemized notes 333, user 112 may manually or automatically set up itemized receipt data collection for alert application 300.

For instance, in some embodiments, user 112 may use the field capture 331 to manually or automatically capture purchased item data. In some embodiments, user 112 may manually use user device 110 and camera devices 212 and/or 218 to capture images of purchased items and/or itemized receipts such as receipt 150. In some embodiments, user 112 may use nearfield communication with tags associated with the purchased items, either on the item or nearby in venues and merchants, to manually capture data about specific purchased items. Alternatively, in some embodiments, user device 110 may be further connected with augmented reality sensors, such as augmented reality eyewear and/or cameras, such that user 112 may manually capture data about specific purchased items or enable the augmented reality sensors to automatically capture data about specific purchased items. Alternatively, in some embodiments, user 112 may provide alert application 300 access is electronic billing information and enable alert application 300 to automatically scan the electronic billing information for itemized receipts. In some embodiments, alert application 300 may have access to a web applet associated with a third-party vendor and automatically receive electronic itemized receipt data.

Whether the itemized purchased item receipt data is captured manually or automatically, user 112 may upload the itemized receipt data through the field upload 332. Once captured and uploaded, alert application 300 may use identification software, such as image recognition applets, augmented reality applets, etc., to analyze the captured images and/or itemized receipts, and identify the purchased products and subcomponents. In some embodiments, alert application 300 may be associated with a database or have access to a third-party database with information data for common goods, including the purchased items captured by images or receipts. Additionally, in some embodiments, the vendor or merchant of the purchased items may provide information to system 100 for each good including itemized components contained within.

It will be further understood, while the above embodiments discuss data collection for purchased items, that in some embodiments, system 100 may collect data from unpurchased goods as well. For instance, in some embodiments, user 112 may manually use user device 110 amid camera devices 212 and/or 218 while shopping to capture images of goods offered at the merchant venue. Alternatively, user 112 may use nearfield communication between the goods and user device 110 to manually or automatically collect information from the goods while shopping. And in some embodiments, user 112 may use augmented reality sensors to manually or automatically collect data from the goods while shopping. In some embodiments, the web applet associated with third-party vendors or user web browser may provide system 100 with information about goods queued in user's virtual shopping basket. These embodiments are not limited to data collection for purchased goods.

Figure 3D:
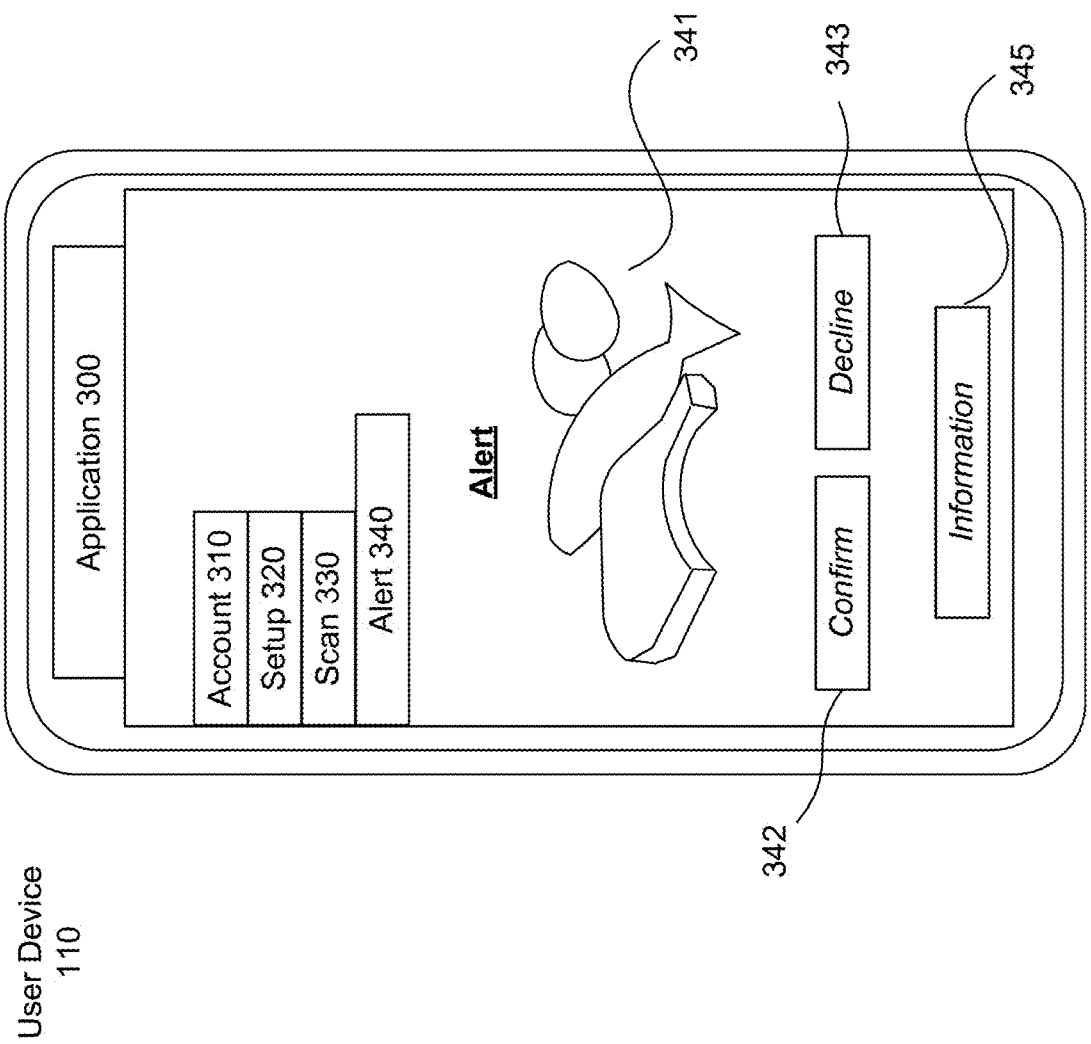
FIG. 3D is a diagram of an exemplary alert system consistent with disclosed embodiments.

FIG. 3D illustrates an interface of an exemplary alert application 300 and sub-menu alert 340. User 112 may re 340 which may include additional information such as an image 341 associated with the alert, a confirm 342 or decline 343 prompt, and information 345. As described herein, user 112 may receive alert 340 via alert application 300 on user device 110 via a user interface or via a web browser interface. And, as described in FIG. 3B, user 112 may receive alert 340 at specific times and time intervals.

Image 341 associated with alert 340 may provide user 112 with a visual representation of the undesired item 140. The undesired item 140 itself may be pictured or the undesired component may be pictured. For example, in some embodiments, therein user 112 purchases a spicy Thai chicken meal, image 341 may include an image of the purchased Thai chicken meal or the alert triggering undesired peanut component/ingredient. Alternatively, in some embodiments, alert application 300 may display as image 341 the manually or automatically captured image of the purchased item and/or itemized receipt.

User 112 may be prompted to clear the alert 340. For example, in some embodiments, user 112 may confirm receipt of the alert by selecting button confirm 342, or user 112 may decline the alert by selecting button decline 343. In some embodiments, and depending on the settings from FIGS. 3A-C, user 112 may need to acknowledge receipt and confirmation of the severity and amounts of undesired components in recent purchased items. And in some embodiments, user 112 may have the option to decline the alert because it no longer is applicable or the severity is low.

Information associated with alert 340 may be presented in interactive field information 345. Information 345 may notify user 112 why the alert triggered, i.e. certain amounts of undesired components in recent purchased items. In some embodiments, information 345 may notify user 112 about the undesired component om data provided to system 100 from third-party vendors or user 112 (i.e. user notes 325). In some embodiments, information 345 may be displayed in multiple languages so user 112 may match foreign purchased components with the purchased item label, or alternatively, match the alert with purchased goods in foreign locations. For instance, in some embodiments, information 345 may be displayed in the user's defined primary language, and system 100 may further use geolocation data from user device 110 to determine a secondary spoken language at the user's current location and display the secondary language as well.

It will be further understood, while the above embodiments discuss alerts for purchased items, that in some embodiments, system 100 may process alert data for unpurchased goods as described in FIGS. 3B-3C. For instance, in some embodiments, system 100 may have access to data from a web browser and/or applet, and system 100 may receive information pertaining to goods in the user's virtual shopping basket prior to purchase. Alternatively, system 100 may receive information, manually or automatically, from goods in the merchant venue prior to purchase as well. User 112 may also setup alerts for these unpurchased goods as well, and system 100 may send user 112 alerts for these unpurchased goods.

Figure 4:
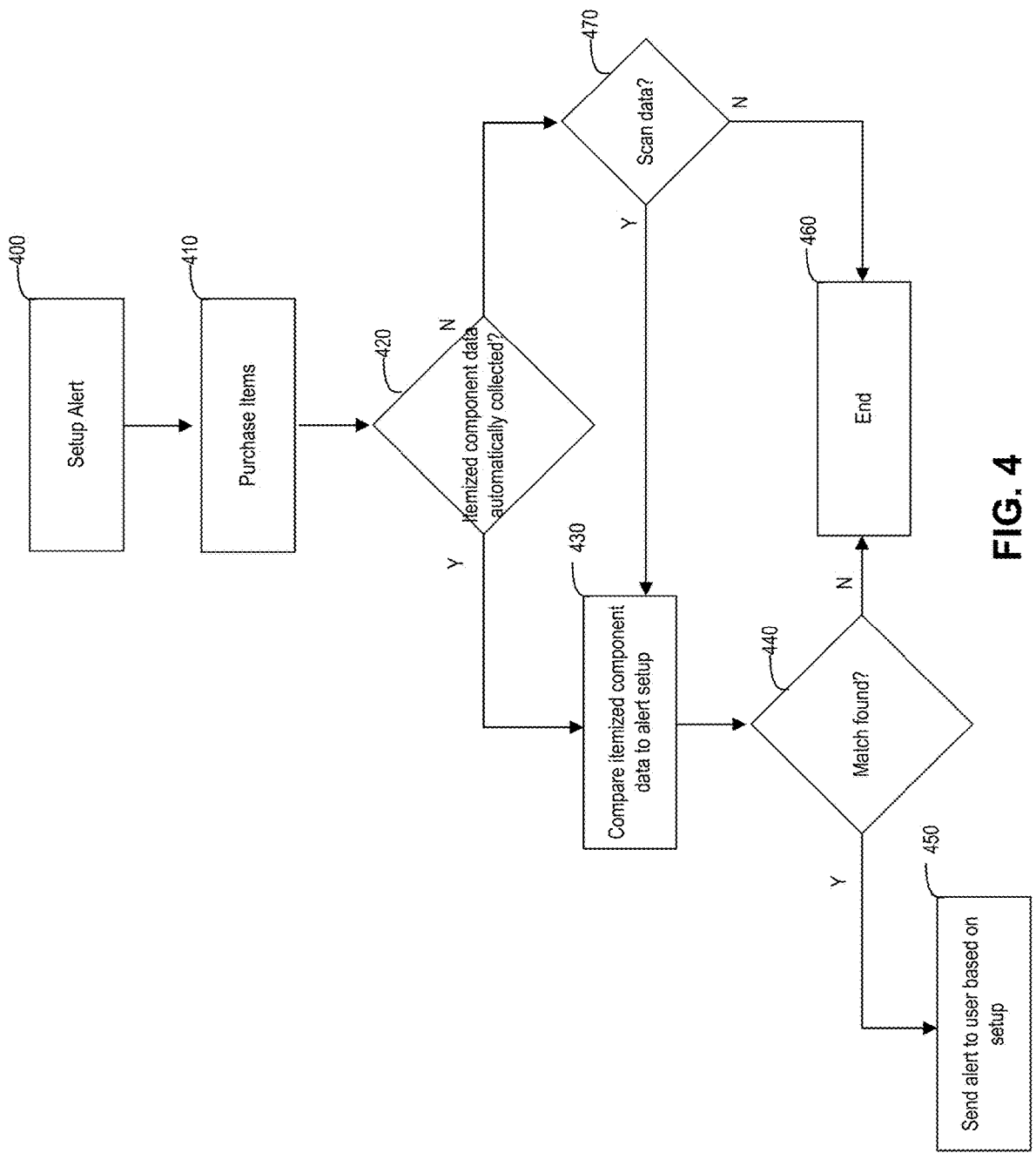
FIG. 4 is a flowchart of an exemplary process for alerting a user to undesired components in purchased items.

FIG. 4 is a is a flow chart of an exemplary process for creating an alert for an undesired purchased item. As described herein, the alert may be for various and multiple categories of purchased items including goods and/or services. System 100 begins by setting up an alert at step 400 and then proceeds to step 410 processing the purchased items. At step 400, system 100 sets up the alert by requesting alert parameters from a user. Alternatively, it will be further understood that in some embodiments, system 100 may receive unsolicited alert parameters from the user instead of requesting the parameters. Alert parameters at least include a set of undesired components as described herein. Alert parameters may include data pertaining to the users themselves or data pertaining to the alert. The alert parameters may include the collected data illustrated in exemplary application 300 such as input data for account 310 and setup 320 from FIGS. 3A-3B. The alert parameters may comprise of pre-existing parameters such as categories of alerts, preferences for the alerts, severity of the alerts, alert timing & frequency of the alerts, etc. And, in some embodiments, the alert parameters may comprise of user custom parameters. In some embodiments, the alert parameters may comprise of component data collection settings as discussed in FIG. 3C. And in some embodiments, the alert parameters may comprise of alert notification settings as discussed in FIG. 3D. In some embodiments, the user may use an interactive applet on a mobile device, browser, or any other user device 110 supported applet to provide the alert parameters including exemplary FIGS. 3A-3D. Alternatively, in some embodiments, the user may set up the alert for another user.

At step 410, system 100 receives a notification that user 112 purchased items. System 100 processes the notification and further determines the source of the notification. In embodiments, the notification may be from the user 112 via user device 110, or alternatively, the notification may be from a third-party. The notice may be a manual update from user 112 or a third-party vendor/merchant, or alternatively, the notice may be an automatic update from user device 110 or the third-party vendor/merchant. From the notice, system 100 may further determine the source of purchase (i.e, the venue or merchant), as well as, determine the time and day of purchase. In some embodiments, the notice may include itemized lists of the purchased items, and the notice may further include subsets of broken-down itemized lists of further subspecies such as components.

System 100 determines at step 420 whether itemized component data for the purchased items automatically collected from the step 410 notice. In some embodiments, step 410 notice from user 112 may include itemized component data for some, or each, of the purchased items. Alternatively, step 410 notice from the third-party vendor/merchant may include itemized component data for some, or each, of the purchased items. System 100 at step 420 determines whether each purchased item is associated with itemized component data. If system 100 determines that itemized component data was automatically collected, from either user 112 or third-party vendors/merchants, then it proceeds to step 430. Otherwise, if system 100 determines that itemized component data was not automatically collected, from any source, then it proceeds to step 470. Alternatively, in some embodiments, system 100 may make this determination on an item-by-item level or for each collective set of items purchased together.

At step 430, system 100 compares the itemized component data to the alert parameters from setup 400. In some embodiments, system 100 may compare the itemized component data against the set of undesired components from step 400. In some embodiments, system 100 may compare the itemized component data against various user parameters such as categories of alerts, preferences, severities, and/or time & frequency.

At step 440, system 100 determines whether there is a match between the compared itemized component data and the user provided undesired component list. If system 100 determines that at least one itemized component matches an undesired component, then the system proceeds to step 450 for sending the alert. Otherwise, if system 100 determines that no itemized component matches an undesired component then the system proceeds to step 460. Alternatively, in some embodiments, system 100 may determine that an itemized component does not exactly match an undesired component, however, system 100 further determines that the unmatched itemized component is similar to the undesired component, then system 100 may also proceed to step 450 for the similar itemized component.

At step 450, system 100 sends an, alert to user 112 based on the setup step 400 parameters. In some embodiments, the sent alert may include parameters and information pertaining to the undesired components, including exemplary information discussed in FIG. 3D. System 100 may send user 112 an alert, with an image associated the undesired component. The purchased item itself may be pictured or the undesired component may be pictured. Alternatively, in some embodiments, system 100 may display the manually or automatically captured itemized component data. The alert away further prompt user 112 to clear, or user 112 may decline the alert. The alert notice may include information associated steps 420-440, such as what matched undesired component triggered the alert. In some embodiments, the associated information may be displayed in multiple languages so user 112 may match foreign purchased components with the purchased item label, or alternatively, match the alert with purchased goods in foreign locations.

At step 460, system 100 may finish by storing the collected parameters from step 400, the collected purchase item information from step 410, the determinations from steps 420-440 (and step 470), and if appropriate, system 100 may store the sent alert from step 450. System 100 may store the parameters, information, determinations, and alert in database 130, or user device 110.

At step 470, after determining that the itemized component data was not automatically collected from step 420, system 100 further determines if there are manually scanned itemized component data. If system 100 determines there is manually scanned data at step 470 then it proceeds to step 430 discussed above, otherwise, the system proceeds to step 460 discussed above. At step 470, system 100 may prompt the user to manually scan itemized purchase data which includes itemized component data, as discussed in exemplary FIG. 3C. In some embodiments, user 112 may capture an age of the purchased item itself. Or in some embodiments, user 112 may capture at image of an itemized receipt. In some embodiments, user 112 may prompt user device 110 to capture data about the purchased item through nearfield communication. Once captured, the itemized receipts and/or component data may be upload to a device associated with system 100 for OCR analysis. Alternatively, in some embodiments, the itemized component data may be uploaded from third-party vendors and/or merchants to a device associated with system 100 for further analysis.

Figure 5:
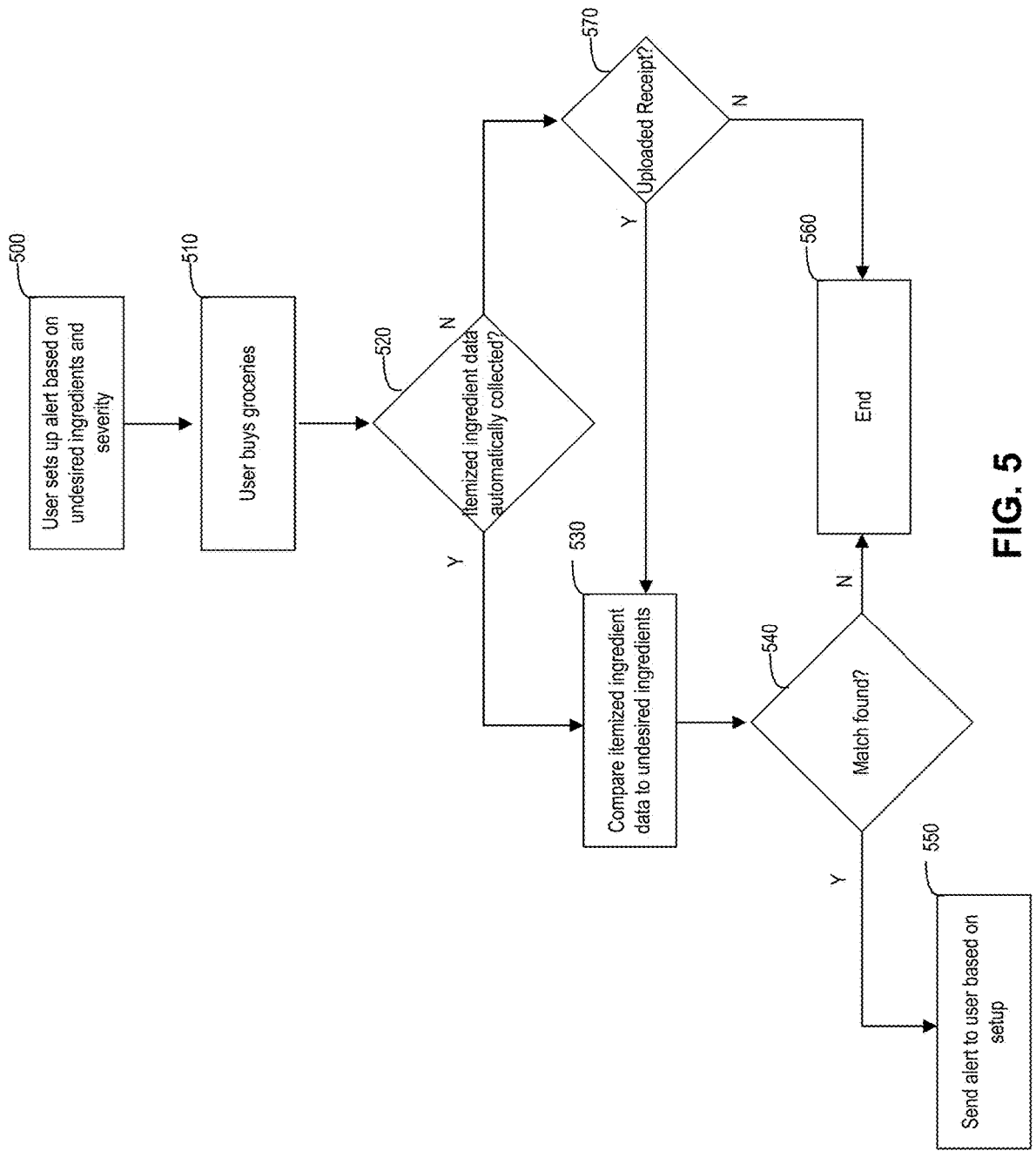
FIG. 5 is a flowchart of an exemplary process for alerting a user to undesired ingredients in purchased groceries.

FIG. 5 is a is a flow chart of an exemplary process for creating an alert for undesired ingredients. In this embodiment, FIG. 5 discusses alerts for dietary categories and the respective undesired ingredient preferences. Like step 400, system 100 begins by setting up an alert at step 500 and then proceeds to step 510 processing the purchased groceries. At step 500, system 100 sets up the alert by requesting alert parameters from a user. Alternatively, it will be further understood that in some embodiments, system 100 may receive unsolicited alert parameters from the user instead of requesting the parameters. Alert parameters t least include a set of undesired ingredients as described herein. Alert parameters may include data pertaining to the user themselves or data pertaining to the alert. The alert parameters may include the collected data illustrated in exemplary application 300 such as input data for account 310 and setup 320 from FIGS. 3A-3B. The alert parameters may comprise of pre-existing parameters such as categories of alerts, preferences for the alerts, se of the alerts, alert timing & frequency of the alerts, etc. And, in some embodiments, the alert parameters may comprise of user custom parameters. In some embodiments, the alert parameters may comprise of component data collection settings as discussed in FIG. 3C. And in some embodiments, the alert parameters may comprise of alert notification settings as discussed in FIG. 3D. In some embodiments, the user may use an interactive applet on a mobile device, browser, or any other user device 110 supported applet to provide the alert parameters, including exemplary FIGS. 3A-3D. Alternatively, in some embodiments, the user may set up the alert for another user.

At step 510, system 100 receives a notification that user 112 purchased groceries. System 100 processes the notification and further determines the source of the notification. In some embodiments, the notification may be from the user 112 via user device 110, or alternatively, the notification may be from a third-party. The notice may be a manual update from user 112 or a third-party vendor/merchant, or alternatively, the notice may be an automatic update from user device 110 or the third-party vendor/merchant. From the notice, system 100 may further determine the source of purchase (i.e. the venue or merchant), as well as, determine the time and day of purchase. In some embodiments, the notice may include itemized lists of the purchased groceries, and the notice may further include subsets of broken-down itemized lists of further subspecies such as ingredients.

System 100 determines at step 520 whether itemized component data for the purchased groceries were automatically collected from the step 510 notice. In some embodiments, step 510 notice from user 112 may include itemized component data for some, or each, of the purchased groceries. Alternatively, step 510 notice from the third-party vendor/merchant may include itemized component data for some, or each, of the purchased groceries. System 100 at step 520 determines whether each purchased grocery is associated with itemized ingredient data. If system 100 determines that itemized ingredient data was automatically collected, from either user 112 or third-party vendors/merchants, then it proceeds to step 530. Otherwise, if system 100 determines that itemized ingredient data was not automatically collected, from any source, then it proceeds to step 570. Alternatively, in some embodiments, system 100 may make this determination on an item-by-item level or for each collective set of groceries purchased together.

At step 530, like step 430, system 100 compares the itemized grocery data to the alert parameters from setup 500. In some embodiments, system 100 may compare the itemized grocery data against the set of undesired ingredients from step 500. In some embodiments, system 100 may compare the itemized ingredient data against various user parameters such as preferences, severities, and/or time & frequency.

At step 540, like step 440, system 100 determines whether there is a match between the compared itemized ingredient data and the user provided undesired ingredient list. If system 100 determines that at least one itemized ingredient matches an undesired ingredient, then the system proceeds to step 550 for sending the alert. Otherwise if system 100 determines that no itemized ingredient matches an undesired ingredient then the system proceeds to step 560. Alternatively, in some embodiments, system 100 may determine that an itemized ingredient does not exactly match an undesired ingredient (i.e, one form of sugar substitute is considered similar to another substitute), however, if system 100 further determines that the unmatched itemized ingredient is similar to the undesired ingredient, them system 100 may also proceed to step 550 for the similar itemized component.

At step 550, like step 440, system 100 sends an alert to user 112 based on the setup step 500 parameters. In some embodiments, the sent alert may include parameters and information pertaining to the undesired ingredients, including exemplary information discussed in FIG. 3D. System 100 may send user 112 an alert with an image associated with the undesired ingredient. The purchased grocery item itself may be pictured sir the undesired ingredient may be pictured. Alternatively, in some embodiments, system 100 may display the manually or automatically captured itemized grocery data. The alert may further prompt user 112 to clear the alert, or user 112 may decline the alert. The alert notice may include information associated with steps 520-540, such as what matched undesired ingredient triggered the alert. In some embodiments, the associated information may be displayed in multiple languages so user 112 may match foreign purchased grocery item with the purchased item label, or alternatively, match the alert with purchased goods in foreign locations.

At step 560, like step 460, system 100 may finish by storing the collected parameters from step 500, the collected purchase grocery information from step 510, the determinations from steps 520-540 (and step 570), and if appropriate, system 100 may store the sent alert from step 550. System 100 may store the parameters, information, determinations, and alert in database 130, or user device 110.

At step 570, like step 470, after determining that the itemized ingredient data was not, automatically collected from step 520, system 100 further determines if there are manually scanned itemized ingredient data. If system 100 determines there is manually scanned data at step 570 then it proceeds to step 530 discussed above, otherwise, the system proceeds to step 560 discussed above. At step 570, system 100 may prompt the user to manually scan itemized purchase grocery data which includes itemized ingredient data, as discussed in exemplary FIG. 3C. In some embodiments, user 112 may capture an image of the purchased grocery itself. Or in some embodiments, user 112 may capture an image of an itemized receipt. In some embodiments, user 112 may prompt user device 110 to capture data about the purchased grocery through nearfield communication. Once captured, the itemized receipts and/or ingredient data may be uploaded to a device associated with system 100 for OCR analysis. Alternatively, in some embodiments, the itemized ingredient data, may be uploaded from third-party vendors and/or merchants to a device associated with system 100 for further analysis.

A person of ordinary skill will now understand that through these steps, system 100 further facilitates the goal of monitoring user purchases. By utilizing user and purchased item data, system 100 may further assist the user bye providing analytics and real time information pertaining to potentially harmful ingredients to the user, or a close relative.

While illustrative embodiments have been described herein, the cope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as ion-exclusive. It is intended, therefore, that the specification and examples be considered as exemplary only, with a true scope and spirit being indicated by the following claims and their full scope of equivalents.

What is claimed is:

1. A system for alerting a user to undesired components in purchased items, comprising:
   one or more memory devices storing instructions; and
   one or more processors configured to execute the instructions to perform operations comprising:
      receiving, from a user device, a list of undesired components of purchasable items;
      receiving, from the user device, a notice that the user purchased an item;
      determining whether itemized component data for the purchased item has been automatically collected from the notice;
      upon determining that the itemized component data has not been automatically collected from the notice:
         receiving, from the user device, at least one of an image of the purchased item or an image of an itemized receipt, wherein the at least one image is captured by an augmented reality sensor associated with the user device and is uploaded from the augmented reality sensor to the user device; and
         analyzing, using at least one of an image recognition application, optical character recognition, or an augmented reality application, the at least one captured image to generate the itemized component data;
      upon analyzing the at least one captured image to generate the itemized component data or upon determining that the itemized component data has been automatically collected from the notice:
         comparing the itemized component data to the list of undesired components; and
         determining, based on the comparison, whether the purchased item contains an undesired component; and
      upon determining that the purchased item contains an undesired component:
         generating an alert identifying the undesired component in the purchased item; and
         sending the alert to the user device.

2. The system of claim 1, wherein sending the alert comprises sending the at least one captured image or an image of the undesired component.

3. The system of claim 2, wherein sending the alert comprises sending the itemized component data.

4. The system of claim 1, wherein the operations further comprise requesting that the user confirm receipt of the alert.

5. The system of claim 1, wherein:
   the operations further comprise identifying, based on information received from the user device, at least one preferred language; and
   generating the alert comprises generating the alert in the at least one preferred language.

6. The system of claim 5, wherein:
identifying the at least one preferred language comprises identifying a primary language and a secondary language; and
generating the alert in the at least one preferred language comprises generating the alert in the primary language and the secondary language.

7. The system of claim 1, wherein:
the operations further comprise receiving, from the user device, at least one alert parameter, wherein the at least one alert parameter comprises at least one of a product category, a user preference associated with a product category, an alert severity rating, an alert timing preference, or an alert frequency preference; and
generating the alert comprises generating the alert based on the at least one alert parameter.

8. The system of claim 7, wherein the product category comprises at least one of dietary products, pharmaceutical products, household cleaning products, automotive products, or clothing products.

9. The system of claim 7, wherein the alert severity rating comprises at least one of low severity, intermediate severity, or high severity.

10. The system of claim 7, wherein the operations further comprise:
collecting, from the user device, an account name for the user, a password for the user, and contact information for the user, wherein the contact information comprises at least one of a physical address, an email address, or a phone number;
registering an account for the user based on the account name, the password, and the contact information; and
storing the at least one alert parameter in association with the account.

11. The system of claim 1, wherein the operations further comprise determining, based on the notice, at least one of a source of the purchased item, a date of purchase of the purchased item, or a time of purchase of the purchased item.

12. The system of claim 1, wherein the operations further comprise storing at least one of the itemized component data, the determination that the purchased item contains an undesired component, or the alert in at least one of the user device or a database.

13. The system of claim 1, wherein the operations further comprise, upon determining that the itemized component data has not been automatically collected from the notice, prompting the user to capture, by the augmented reality sensor associated with the user device, the at least one captured image.

14. A user device for alerting a user to undesired components in purchased items, comprising:
one or more memory devices storing instructions; and
one or more processors configured to execute the instructions to perform operations comprising:
receiving a list of undesired components of purchasable items;
receiving a notice that the user purchased an item;
determining whether itemized component data for the purchased item has been automatically collected from the notice;
upon determining that the itemized component data has not been automatically collected from the notice:
receiving at least one of an image of the purchased item or an image of an itemized receipt, wherein the at least one image is captured by an augmented reality sensor associated with the user device and is uploaded from the augmented reality sensor to the user device; and
analyzing, using at least one of an image recognition application, optical character recognition, or an augmented reality application, the at least one captured image to generate the itemized component data;
upon analyzing the at least one captured image to generate the itemized component data or upon determining that the itemized component data has been automatically collected from the notice:
comparing the itemized component data to the list of undesired components; and
determining, based on the comparison, whether the purchased item contains an undesired component; and
upon determining that the purchased item contains an undesired component, generating an alert configured to be displayed on the user device and identifying the undesired component in the purchased item.

15. A method for alerting a user to undesired components in purchased items, comprising:
receiving, from a user device, a list of undesired components of purchasable items;
receiving, from the user device, a notice that the user purchased an item;
determining whether itemized component data for the purchased item has been automatically collected from the notice;
upon determining that the itemized component data has not been automatically collected from the notice:
receiving, from the user device, at least one of an image of the purchased item or an image of an itemized receipt, wherein the at least one image is captured by an augmented reality sensor associated with the user device and is uploaded from the augmented reality sensor to the user device; and
analyzing, using at least one of an image recognition application, optical character recognition, or an augmented reality application, the at least one captured image to generate the itemized component data;
upon analyzing the at least one captured image to generate the itemized component data or upon determining that the itemized component data has been automatically collected from the notice:
comparing the itemized component data to the list of undesired components; and
determining, based on the comparison, whether the purchased item contains an undesired component; and
upon determining that the purchased item contains an undesired component:
generating an alert identifying the undesired component in the purchased item; and
sending the alert to the user device.

16. The method of claim 15, further comprising identifying, based on information received from the user device, at least one language, and wherein generating the alert comprises generating the alert in the at least one language.

17. The method of claim 15, further comprising receiving, from the user device, at least one alert parameter, and wherein:
the at least one alert parameter comprises at least one of a product category, a
user preference associated with a product category, an alert severity rating, an alert timing preference, or an alert frequency preference; and generating the alert comprises generating the alert based on the at least one alert parameter.

18. The method of claim 15, further comprising storing at least one of the itemized component data, the determination that the purchased item contains an undesired component, or the alert in at least one of the user device or a database.

19. The method of claim 15, further comprising, upon determining that the itemized component data has not been automatically collected from the notice, prompting the user to capture, by the augmented reality sensor associated with the user device, the at least one captured image.

20. The method of claim 15, further comprising requesting that the user confirm receipt of the alert.

* * * * *